(12) United States Patent
Austin

(10) Patent No.: US 6,796,592 B1
(45) Date of Patent: Sep. 28, 2004

(54) TAILGATE COUNTERBALANCING HINGE

(75) Inventor: Donald M. Austin, Perkinsfield (CA)

(73) Assignee: M & C Corporation, Warren, MI (US)

( * ) Notice: Subject to any disclaimer, the term of this patent is extended or adjusted under 35 U.S.C. 154(b) by 0 days.

(21) Appl. No.: 10/386,884

(22) Filed: Mar. 12, 2003

(51) Int. Cl.$^7$ .............................................. B62D 33/03
(52) U.S. Cl. ...................................................... 296/57.1
(58) Field of Search ...................... 296/57.1, 59, 146.1; 16/75, 308; 49/386, 389

(56) References Cited

U.S. PATENT DOCUMENTS

| | | |
|---|---|---|
| 2,395,456 A | 2/1946 | Bunker |
| 2,733,476 A | 2/1956 | Eck |
| 2,799,891 A | 7/1957 | Ragsdale |
| 2,810,153 A | 10/1957 | Semar |
| 2,984,517 A | 5/1961 | Farrow et al. |
| 3,031,225 A | 4/1962 | Saffer et al. |
| 3,085,286 A | 4/1963 | Whitehouse et al. |
| 3,122,775 A | 3/1964 | Pulleyblank |
| 3,146,847 A | 9/1964 | Rutman et al. |
| 3,166,783 A | 1/1965 | Mackie et al. |
| 3,336,070 A | 8/1967 | Jackson |
| 3,370,317 A | 2/1968 | Marchione |
| 3,402,508 A | 9/1968 | Kessler |
| 3,643,378 A | 2/1972 | Velavicius et al. |
| 3,649,067 A | 3/1972 | Louton, Jr. |
| 3,695,678 A | 10/1972 | Gergoe |
| 3,699,716 A | 10/1972 | Wanlass |
| 3,787,923 A | 1/1974 | Peterson |
| 4,143,904 A | 3/1979 | Cooper et al. |
| 4,291,501 A | 9/1981 | Steinberg et al. |
| 4,378,658 A | 4/1983 | DeLorean |
| 4,589,164 A | 5/1986 | Leonard |
| 4,701,977 A | 10/1987 | Hori et al. |
| 4,702,511 A | 10/1987 | Olins |
| 4,787,809 A | 11/1988 | Zroslik |
| 4,845,811 A | 7/1989 | Fargnier |
| 4,905,347 A | 3/1990 | Worth |
| 5,039,154 A | 8/1991 | Lewis |
| 5,358,301 A | 10/1994 | Konchan et al. |
| D370,453 S | 6/1996 | Shortman et al. |
| 5,606,773 A | 3/1997 | Shappell |
| 5,641,262 A | 6/1997 | Dunlop et al. |
| 5,787,549 A | 8/1998 | Soderlund |
| 5,988,724 A | 11/1999 | Wolda |
| 6,283,463 B1 | 9/2001 | Park |

*Primary Examiner*—Lori L. Coletta
(74) *Attorney, Agent, or Firm*—Carlson, Gaskey & Olds

(57) ABSTRACT

A tailgate counterbalancing hinge assembly includes a linear torque rod, a first end assembly and a second end assembly. One end assembly pivotally retains the tailgate while permitting the torque rod to be rigidly coupled to the tailgate for movement with the tailgate about a pivot axis. The other end assembly pivotally retains the tailgate and permits the end of the torque rod to be rigidly retained with respect to the vehicle body. The assemblies are easily mounted in the vehicle using brackets that are secured to the tailgate and a vehicle body hinge pin to simplify installation and repair of the assembly.

13 Claims, 3 Drawing Sheets

TAILGATE COUNTERBALANCING HINGE

BACKGROUND OF THE INVENTION

1. Field of the Invention

The present invention relates to vehicle body closure panels, in which a torque rod with end assemblies forms a counterbalanced pivot connection between a tailgate and vehicle body pillars, the counterbalance biasing the torque rod to an unbiased tailgate position permitting tailgate removal from the vehicle body.

2. Background Art

Vehicle body closure members such as a tailgate are pivotally mounted between body side panels forming the pillars at the rear of the vehicle. The tailgate pivots about a hinge axis between a horizontal, open position and a vertical, closed position. Preferably, the mounting assemblies for the tailgate permit the tailgate to be removed, and this has been accomplished in a known construction when the tailgate is pivoted to a position between the fully open or fully closed position. For example, the tailgate may include hinge pins that extend outwardly along the hinge axis that removably connect into brackets carried on the truck body. When the tailgate is pivoted to a predetermined intermediate position, for example, 15° away from the fully closed position, at least one of the hinge pins slips through a slot in the connecting bracket as the tailgate is lifted at one end from the truck body.

Some of the tailgate mounting assemblies include a spring bias assist for assisting movement and counterbalancing the weight of a tailgate during opening and closing movements. One previously known mechanism in which a torque rod provides spring biasing between the tailgate and the body panel pillars carries the torque road on assemblies that form the pivots for the tailgate. Since the torque rod forms a portion of the pivot assembly, the torque rod must be installed for the tailgate to pivot and thus complicates the assembly procedure. Moreover, the torque rod may require particularly configured ends that complicate production of the parts before assembly.

A previously known tailgate may use hinge pin trunnions for pivoting and the torque rod is preformed and installed into the tailgate in a complex and intricate procedure. For example, during assembly of the tailgate, the stationary end of the rod has to be aligned with an aperture that exposes the end for attachment outside of the tailgate while the anchoring end is aligned with a reenforcement plate located inside the tailgate. All of the aligning must be performed while the torque rod is carried within the interior of the tailgate and the procedure may be difficult and time consuming. Moreover, numerous components are required to assemble the torque rod to the tailgate. Other types of springs used in place of the torque rod are difficult to install within the confines of tailgates made of inner and outer panels joined together before the hinge assembly is mounted. Moreover, such assemblies may be difficult to repair and replacement parts are complex and expensive.

SUMMARY OF THE INVENTION

The present invention overcomes the above mentioned disadvantages by providing a tailgate counterbalancing hinge in a vehicle closure assembly that includes a torque rod having first and second end assemblies, at least one end assembly being readily attachable to and removable from the torque rod. The first end assembly includes a first support for pivotally carrying the tailgate adjacent a body pillar. The first support preferably includes a cup, and a retainer bushing pivotally received by said cup includes a stem for locking said bushing with respect to the tailgate. The second end assembly has a second support for pivotally carrying a tailgate adjacent to a body pillar. The second support preferably has a key. In the preferred embodiment, a spriget combines the key with a mount for securing the key to a facing body panel, preferably a body pillar. A pivot body has a slot aligned for reception of the key. A pivot bushing is received in an opening in said tailgate and carries the pivot body. The torque rod has a first end securely received in the first end assembly for movement with the retainer bushing, and a second end securely received in the second end assembly by the pivot body.

In the preferred embodiment, the torque rod has a faceted crosssection at least at an end, and preferably at each end. As used in the present application, the faceted cross-section refers to any cross-section having at least one surface discontinuity that prevents rotation within a correspondingly shaped, compatible piece. The cross-section may be longitudinally continuous for ease of manufacture of the torque rod or may be formed only on parts of the rod.

In addition, the present invention comprises a method for assembling a selectively removable tailgate to a vehicle body pillar at each end of the tailgate, wherein the hinge includes a torque rod with a faceted cross-section or at least end portions with a faceted cross-section. The method includes receiving a first end of the torque rod in a retainer bushing with a faceted cross-section receiver. The method also includes receiving a second end of the torque rod in a cup with a faceted cross-section receiver, retaining the retainer bushing with respect to the tailgate, and retaining the cup by slidably receiving the cup with respect to a spriget fixed to a body pillar. By sliding the retainer bushing over a spriget's key, fixed to the vehicle body pillar, the pillar pivotally supports a retainer bushing.

BRIEF DESCRIPTION OF THE DRAWINGS

The present invention will be more clearly understood by reference to the following detailed description of a preferred embodiment when read in conjunction with the accompanying drawing in which like reference characters refer to like parts throughout the views and in which.

DETAILED DESCRIPTION OF THE PREFERRED EMBODIMENT

Figure 1:
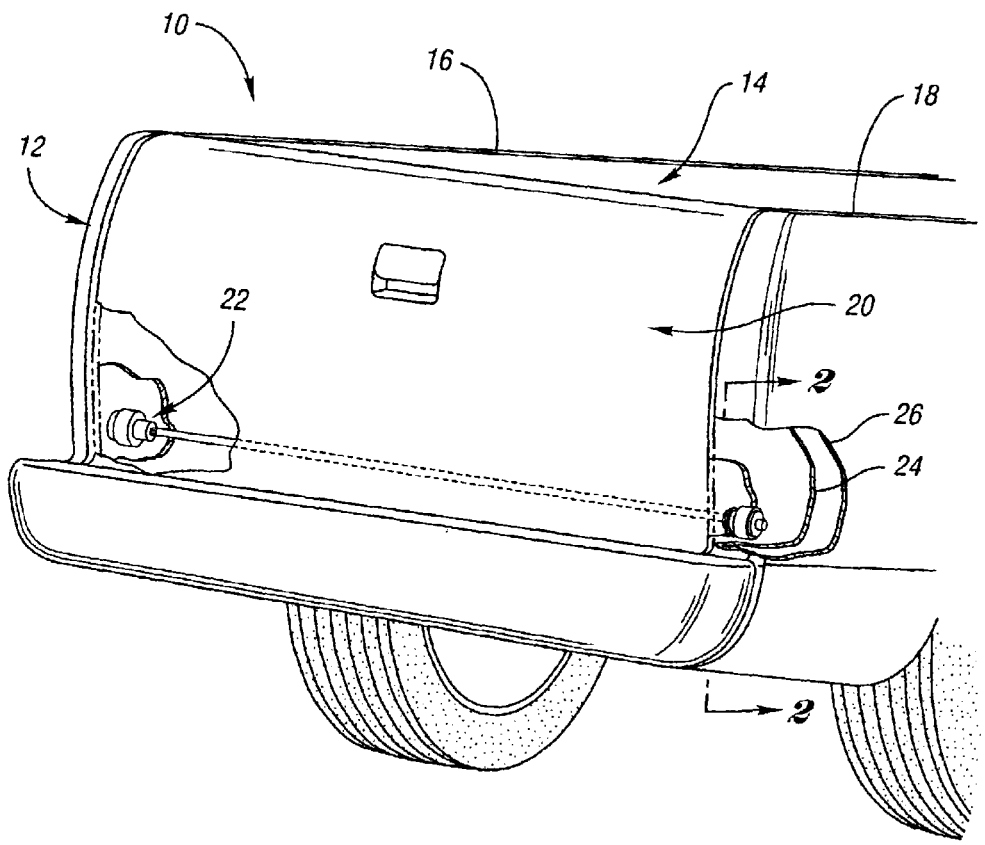
FIG. 1 is a perspective view of a vehicle body tailgate assembly.

Referring first to FIG. 1, a motor vehicle 10 is shown having a vehicle body 12 including a rear compartment or bed 14 enclosed by side panels 16 and 18 as well as a tailgate 20. A counterbalancing hinge assembly 22 pivotally supports the tailgate 20 between the side panels 16 and 18 in a manner to be described in greater detail below.

The tailgate 20 is pivotally supported between pillars formed by the side panels 16 and 18. Typically, as shown in the cutaway in FIG. 1, body panels such as the side panels 16 and 18 and the tailgate 20 are formed by inner and outer panels 24 and 26, respectively, of sheet metal joined at the ends by overlapping flanges or the like that reinforce the planar expanses of the sheet metal forming the side panel. Of course, other materials may be used in constructing the vehicle body 12 and the hinge assembly 22 without departing from the present invention. As a result, although FIG. 1 shows a sheet metal construction in which separated panels form a pillar that supports pivotal movement of the tailgate, other structures may form a structurally rigid pillar.

The counterbalance hinge assembly 22 comprises a torque rod 30 which is linear and aligned along a pivot axis between the pillars. The rod 30 carries a first end assembly 32 and a second end assembly 34. These assemblies 32 and 34 enable the torque rod 30 to be secured with respect to the tailgate 20 at a first end, and with respect to the vehicle body at the second end, respectively.

Figure 2:
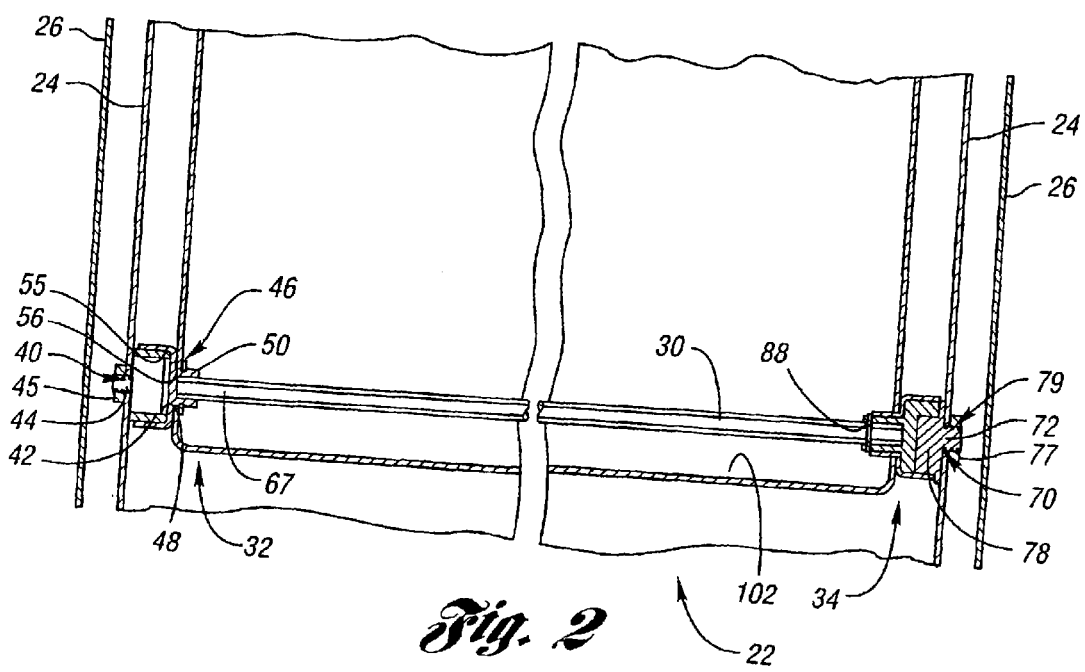
FIG. 2 is a sectional view taken through the tailgate assembly shown in FIG. 1.

The first end assembly 32 for securing the torque rod 30 to the tailgate 20 also pivotably supports the tailgate 20, preferably at the left body pillar including panel 24 as shown in FIG. 2. The first end assembly 32 forms a left side vehicle hinge pin that includes a pivot member 40 having a cylindrical boss 42 and a mounting stem 44. The mounting stem 44 secures the pivot member 40 to the vehicle pillar at left inner panel 24. For example, the stem 44 may be a square housing received in a square opening in the interior panel 24 of the left side panel 16, and secured in position by welds, adhesive or other fasteners. Equivalents, such as a stem 44 that may be a threaded member that is received in a weld nut 45 mounted on a hidden surface of the body panel 24 at the left side panel 16, may be used. Of course, other means of mounting the end assemblies 32 and 34, and aligning hinge pin elements such as the cylindrical boss 42 on the pivot axis, can be used without departing from the scope of the present invention.

The end assembly 32 of the preferred embodiment enables an end of the torque rod to be secured to the tailgate. Preferably, the connection includes a retainer bushing 46 which is pivotally or rotatably received about the boss 42. In the preferred embodiment, the retainer bushing 46 includes a cylindrical receptacle 48 and a stem 50. The stem 50 may have an exterior configuration that is faceted to be retained in an opening 52 in the left end 23 of tailgate 20. Equivalently, the bushing 46 may also be welded or otherwise attached to the left end 23 of the tailgate 20 without departing from the invention. The stem 50 may also be modified or faceted as desired to mount to the tailgate 20. In another preferred embodiment, the surface of the receptacle 48 may fit in an enlarged opening in the panel 23 aligned with the pivot axis extending through a portion of a tailgate end panel 23. The receptacle 48, or the stem 50 may be configured exteriorly or otherwise fastened to avoid relative rotation between the bushing 46 and tailgate end 23 so that the pivot bushing 46 that receives the torque rod pivots with the tailgate 20.

Figure 3:
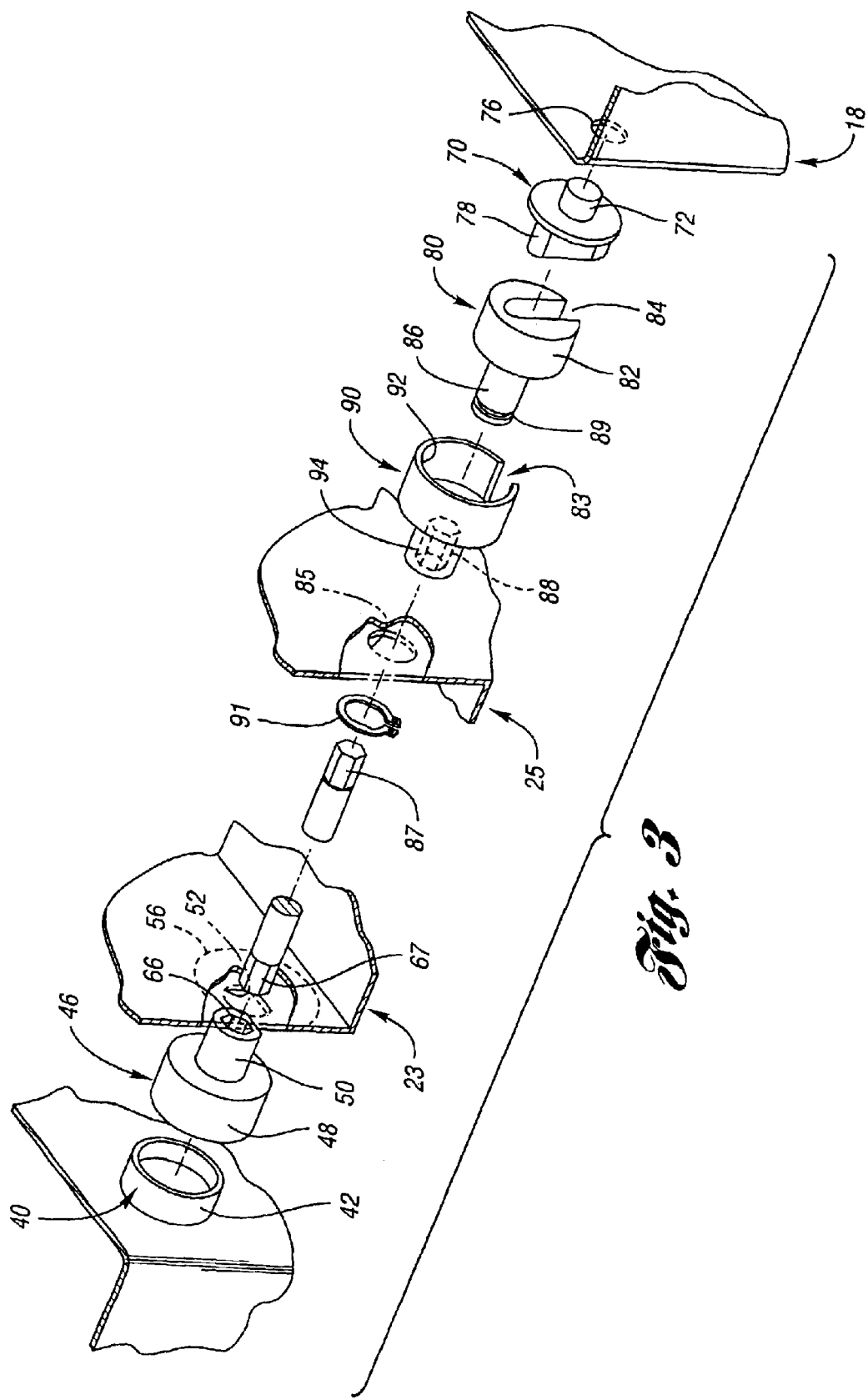
FIG. 3 is an enlarged exploded view of the hinge assembly employed in the tailgate assembly of FIGS. I and 2.

As best shown in FIG. 3, the stem 50 also includes a chamber 66 that receives an end portion of the torque rod 30, that is faceted corresponding to the chamber 66 as shown, and locks the retainer bushing 46 to the torque rod 30. For example, in the preferred embodiment, where the torque rod 30 comprises a hexagonal shaft end, the opening 66 may be compatibly configured to avoid relative rotation between the retainer bushing 46 and the torque rod end 67.

Referring again to FIG. 2, the second end assembly 34 has a vehicle hinge pin for pivotally carrying the tailgate 20 adjacent to the right side panel 18, and in the preferred embodiment, includes a spriget 70. The spriget 70 combines a key 78 with a mount 79 for securing the key 78 to the right hand panel, preferably at a body pillar. As shown in FIG. 2, the mount 79 is in the form of a stem 72 received in an opening 76 (FIG. 3). A fastener such as nut 77 or the like, may be retained beneath the bracket 74 (FIG. 4) for fastening the stem 72 to the bed wall, although other means can be used for attachment without departing from the invention. The key 78 has an elongated shape, the elongated shape being aligned in a direction intermediate the vertical, closed and the horizontal, open positions of the tailgate 20 to define a removal direction along the elongated axis of the key body 78. The key 78 is received in the slot 83 of the pivot bushing 90 and in the slot 84 of the pivot body 80 of the vehicle body hinge pin.

As best shown in FIG. 3, the second end assembly 34 (FIG. 2) also includes a pivot body 80 having a cylindrical body 82 with a radial slot 84 aligned for reception of the key 78. The pivot body 80 also includes a stem 86 having a chamber 88 adapted to receive, preferably in a press fit, or otherwise securing, the right end 87 (FIG. 4) of the torque rod 30 in the body 80. The assembly 34 also includes a pivot bushing 90 which can be mounted within an opening 85 of the tailgate end 25. The pivot bushing 90 includes a chamber 92 adapted to pivotally receive body 82 of the pivot body 80. For example, the pivot bushing 90 may include a stem 94 received in the correspondingly configured opening 85. The configuration of the opening 85 may non-rotatably retain the pivot bushing 90 in the inner wall of the tailgate 20. The pivot bushing 90 may be retained in the opening 85 by a retainer, for example, a snap ring engaged in a groove on the stem 94. However, in the preferred embodiment, the stem 86 includes a groove 89 that receives a snap ring 91 at a position adjacent the end of stem 94.

When assembled as shown in FIG. 2, it will be understood the right hand end 87 of the torque rod 30 is retained in a stationary position by the pivot body 80 passing through the pivot bushing 90 mounted in the tailgate 20. The rigid connection to the body pillar is made by the bracket 74 and spriget 70 as assembled as discussed above. At the same time, the left hand end 67 of the torque rod 30 is retained by the tailgate wall 23 to move with the tailgate 20. Thus, as the tailgate 20 is moved between the upright, closed position and the horizontal, open position, the torque rod 30 is forced to twist. Preferably, the unbiased position of the torque rod 30 occurs when the tailgate 20 is aligned with the elongated axis of the key 78, whereby spring tension is introduced to pivot the tailgate 20 away from the closed position when it is unlatched, and to raise it to the closed position when it has been unlatched from its open position. The latching of the tailgate in the open position could be done in a well known manner outside of the structure of the counterbalance hinge assembly, for example, over center locking arms at the ends of the tailgate.

Figure 4:
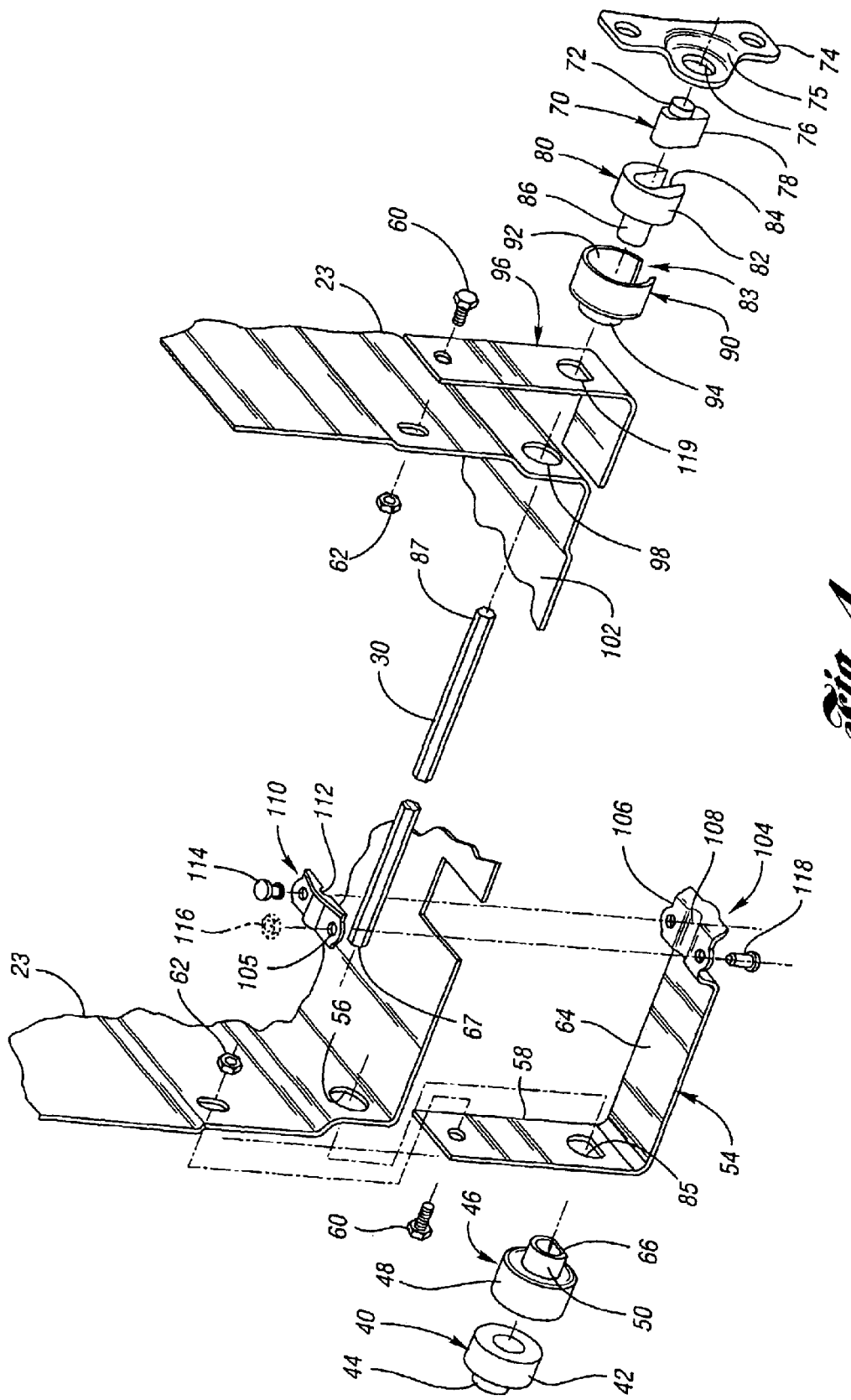
FIG. 4 is an enlarged exploded view of a modified hinge assembly according to the present invention.

Although many of the components described in FIGS. 2 and 3 are also shown in FIG. 4, FIG. 4 demonstrates a modification that eases assembly and repair of the counterbalancing hinge mechanism. In the preferred embodiment, the stem 50 is correspondingly sized to fit in the opening 85 of a tailgate panel attachment bracket 54. The attachment bracket 54 may reinforce the end panel of the tailgate and simplifies the formation of opening 52 receiving the bushing to retain the torque rod with respect to the tailgate in the preferred embodiment. Rather than trying to form a properly sized and configured opening in the tailgate end 23 at opening 56, the bracket 54 with opening 85 is placed next to an enlarged opening 56 in the tailgate end 23. The openings 85 and 56 are aligned with the pivot axis extending through the tailgate 20. For example, an upper flange 58 is bolted to the inner panel 23 of a tailgate 20 by a bolt and nut 60 and 62, respectively, although welds or other fasteners do not depart from the invention. The opening 85 may be configured to avoid relative rotation between the stem 50 or receptacles 48 and the opening 56, so that when assembled, both the installation bracket 54 and the pivot bushing 46 pivot with the tailgate 20. The stem 50 also includes a chamber 66 that receives an end 67 of the torque rod 30, as shown, and locks the retainer bushing 46 to the torque rod 30.

At the left hand end assembly 32, an end 64 of the bracket 54 includes a releasable engagement clamp 104. The clamp 104 includes a clamp seat 106 raised to align the clamp 104 on the pivot axis. The bracket 54 may have an offset arm, bent as shown, or raised up in a similar manner to provide a raised position for the clamp 104 above the plane of the flange 64. The seat 106 includes a cavity 108 which is aligned with the pivot axis extending through the opening 52 and the retainer bushing 46. A clamping flange 110 may be similarly configured to include a recess 112. Either the recess 112, or the recess 108, or both may be configured in compliance with a faceted segment of the torque rod 30 so that clamping of the flange 110 against the clamping seat 106 rigidly retains the torque rod 30 with respect to the bracket 54, and thus the tailgate 20. The raising of the clamp to align the axis of the torque rod with the pivot axis by the raised seat 106 provides room for fasteners, such as the head of a rivet extending through aligned apertures in the seat 106 and the flange 110. In the preferred embodiment, a single rivet 114 is used to retain one side of the flange 110 with the clamp seat 108. On the opposite side of the recesses 108 and 112, the flange 110 may be provided with a weld nut 116 that threadably receives a bolt 118 extending from beneath the seat 106.

Referring again to FIG. 4, the second end assembly 34 has a vehicle hinge pin for pivotally carrying the tailgate 20 adjacent to the right side panel 18, and in the preferred embodiment, includes a spriget 70 combining a key 78 with a mount 79 for securing the key 78 to the right hand panel, preferably at a body pillar. As shown in FIG. 2, the mount 79 is in the form of a stem 72 received in a bracket 74 having a bossed opening 76. The axially extended boss 75 having the opening 76 enables a fastener such as a nut 77 or the like to be retained beneath the bracket 74 for non-rotatably fastening the key 78 in position. In addition, the bracket 74 reinforces the inner panel 24 to which the bracket 74 may be bolted or otherwise fastened to panel 18 (FIG. 1) although it will be understood that the size and type of mounting may be varied from those shown without departing from the present invention.

Preferably, the opening 98 in a bracket 96 is aligned with opening 85, preferably in a manner similar to the aligned mounting of bracket 54, and mounted to the outside of the tailgate end. The pivot bushing 90 carried by the bracket includes a chamber 92 adapted to pivotally receive body 82 of the pivot body 80. For example, the pivot bushing 90 may include a stem 94 received in the correspondingly configured opening 98. The configuration of the opening 98 may non-rotatably retain the pivot bushing 90 to the end wall of the tailgate 20, although other means for retaining the bushing do not depart from the invention.

As a result, the parts of hinge assembly 22 may be loosely assembled, the parts can be positioned before spring tension is applied to the counterbalance hinge assembly. The torque rod 30 is retained in the retainer chamber formed by the recesses 112 and 108. First, the brackets 54 and 96 are attached to the tailgate 20, preferably by welding, so that configured opening 85 and 119 are aligned over openings 52 and 98 punched into the ends of the tailgate. This enables configured openings 85 and 119 to be preferably sized, shaped and positioned after the tailgate has been manufactured, and overcomes the difficultly of shaping, sizing and aligning the apertures of the original tailgate panel stampings. The screw 118 is initially installed in a pre-production or fabrication assembly procedure, for example, fed into a nut and, preferably, an integrally formed threaded opening 105, and left loose for tightening at the assembly plant. At the production assembly plant, the entire bracket 54 is secured by welding or other fastening to the tailgate 20. An aperture at the bottom of the tailgate receives the clamp portion 104 on the lower leg 64 of the bracket 54. The rod 30, carrying pivot body 80 at end 87 is positioned so that end 67 is inserted through opening 98 to extend across the body 12 through the tailgate 20 and into the faceted, complementary hole formed by the recesses 112 and 108. The torque rod is inserted through the bushing 90 already attached, for example by welding or mechanical connection, to bracket 96 in a prior, pre-production or fabrication operation. A preferred mechanical connection may expand or turn the stem walls beyond the perimeter of the opening receiving the stem. Screw 118 is then tightened to provide proper biasing between the vertical, closed and horizontal, open positions.

The assembly discussed above provides a mechanism for removably mounting a closure member between spaced apart body side panels of a vehicle body that is generally consistent with the structures claimed in U.S. Pat. No. 5,988,724, but showing how the hinge can be simplified by using a linear torque rod extending across both sides (lateral ends) of the tailgate. For example, each of the brackets 54 and 96 is a hinge bracket and associated with a pivot bushing 46 and 90, respectively. In addition, the pivot 40 forms a vehicle body hinge pin on one end (lateral side) rotatably or pivotably engaged in the bushing, while the pivot body 80 and spriget 70 form a vehicle body hinge pin for mounting to the side panel at the other end of the tailgate. The assemblies provide means for connecting the torque rod in driving engagement with the vehicle body hinge pin within the bushing and independently of the rotatable support of the bushing on the hinge pin. Like the previously patented torque rod configured for mounting on a single end of the tailgate, the present invention permits the bushing to be received laterally downwardly over at least a portion of the vehicle body hinge pin when the closure member is in the removal position. Accordingly, the torque rod is twisted in tension when the closure member is pivoted to either the closed or open positions from the removal position. This tension provides a counterbalancing effort to assist with pivotal movement of the closure member. Nevertheless, the assembly permits facile removal of the closure member from the vehicle body when the closure member is in the removal position.

Having thus described the present invention, many modifications will become apparent to those skilled in the art to which it pertains without departing from the scope and spirit of the present invention as defined in the appended claims.

What is claimed is:

1. A mechanism for removably mounting a closure member between spaced apart body side panels of a vehicle body for movement about a pivotal axis between open, closed and removal positions comprising, in combination:

hinge brackets adapted to be secured to opposite ends of the closure member with each of said hinge brackets having a bushing thereon whose axis is coincident with the axis of pivotal movement of said closure member;

a vehicle body hinge pin for mounting on each of the spaced apart body side panels coincident with the axis of pivotal movement of the closure member, and configured to rotatably support said bushing thereon, and in turn said closure member on which the hinge brackets are mounted;

at least one of said bushings having a laterally opening slot therein positioned circumaxially to permit the bushing to be received laterally downwardly over at least a portion of said vehicle body hinge pin when the closure member is in the removal position;

a linear torque rod having one end connected in driving engagement to said hinge bracket and the opposite end adapted for connecting the torque rod in driving engagement with said vehicle body hinge pin within a pivot bushing and independently of the rotatable support of the bushing on the hinge pin; and said torque rod being twisted in tension when the closure member is pivoted to either the closed or open positions from the removal position, thereby providing a counterbalancing effort to assist with pivotal movement of the closure member, and permitting facile removal of the closure member from the vehicle body when the closure member is in the removal position.

2. The mechanism as defined in claim 1 wherein said at least a portion of the vehicle body hinge pin is a key.

3. A tailgate counterbalancing hinge comprising:

a first end assembly with a support for pivotally carrying a tailgate adjacent a body panel, the support including a pivot member, and a retainer bushing pivotally received by said pivot member and including a stem for locking said bushing with respect to the tailgate;

a second end assembly with a support for pivotally carrying a tailgate adjacent to an opposed body panel, the support including a key with a mount or securing said key to said opposed body panel, a pivot body having a slot aligned for reception of said key, and a pivot bushing received in an opening in said tailgate and carrying said pivot body; and a torque rod having a first end secured for movement with said retainer bushing and a second end secured with respect to said pivot body.

4. The counterbalancing hinge as described in claim 3 wherein at least one end of said torque rod has a faceted cross-section.

5. The counterbalancing hinge as described in claim 4 wherein said faceted cross-section is longitudinally continuous.

6. The counterbalancing hinge as described in claim 3 wherein said retainer bushing has a telescoping engagement with said torque rod.

7. The counterbalancing hinge as described in claim 3 wherein said pivot body has telescoping engagement with said torque rod.

8. The counterbalancing hinge as described in claim 3 wherein said pivot body is rotatably received by said pivot bushing.

9. The counterbalancing hinge as described in claim 8 wherein said pivot body includes a stem and a retainer for locking said stem for rotation in said pivot bushing.

10. The counterbalancing hinge as described in claim 9 wherein said retainer comprises a snap ring received in a circumferential groove in said stem.

11. A vehicle body comprising:

a bed, a pillar structure comprising body pillars on opposed sides of said bed, a tailgate, and a hinge structure pivotally and selectively removably supporting the tailgate at the pillars, the hinge structure including a first end assembly with a support for pivotally carrying the tailgate adjacent a body pillar, the support including a pivot member, and a retainer bushing pivotally received by said pivot member and including a stem for locking said bushing with respect to the tailgate;

a second end assembly with a support for pivotally carrying the tailgate adjacent to said body pillar, the support including a spriget with a mount for securing said spriget to an opposed body pillar, said spriget having a key; a pivot body having a slot aligned for reception of said key; and a pivot bushing received in an opening in said tailgate and carrying said pivot body; and a torque rod having a first end secured for movement with said retainer bushing and a second end secured with respect to said pivot body.

12. A method for assembling a selectively removable tailgate to a vehicle body pillar at each end, with a hinge structure, wherein said hinge structuir includes a torque rod with at least a portion having a faceted cross-section, receiving a first end of said torque rod in a retainer bushing with a correspondingly faceted cross-section receiver, receiving a second end of said torque rod in a pivot body with a correspondingly faceted cross-section receiver, retaining said retainer bushing with respect to said tailgate, retaining said pivot body by slidably receiving said pivot body with respect to a spriget fixed to the body pillar, and sliding said retainer bushing over a mount fixed to the vehicle body pillar and pivotally supporting said retainer bushing.

13. The method as described in claim 12 wherein said comprises installing a bracket having an opening in said tailgate, hinge in said opening.

* * * * *

UNITED STATES PATENT AND TRADEMARK OFFICE
CERTIFICATE OF CORRECTION

PATENT NO.    : 6,796,592 B1
DATED         : September 28, 2004
INVENTOR(S)   : Austin It is certified that error appears in the above-identified patent and that said Letters Patent is hereby corrected as shown below:

Column 8,
Lines 53-55, should read as:
-- The method as described in claim 12 wherein said retaining said retainer bushing comprises installing a bracket having an opening in said tailgate and inserting said retainer bushing in said opening. --

Signed and Sealed this

Seventh Day of December, 2004

JON W. DUDAS
*Director of the United States Patent and Trademark Office*